(12) United States Patent
Lum et al.

(10) Patent No.: US 8,107,906 B2
(45) Date of Patent: Jan. 31, 2012

(54) TRANSCEIVER WITH RECEIVE AND TRANSMIT PATH PERFORMANCE DIVERSITY

(75) Inventors: Allan Lum, San Diego, CA (US); Todd Sutton, Del Mar, CA (US)

(73) Assignee: Wi-LAN Inc., Ottawa, Ontario (CA)

( * ) Notice: Subject to any disclaimer, the term of this patent is extended or adjusted under 35 U.S.C. 154(b) by 809 days.

(21) Appl. No.: 11/625,248

(22) Filed: Jan. 19, 2007

(65) Prior Publication Data

US 2008/0174470 A1 Jul. 24, 2008

(51) Int. Cl.
*H04B 17/02* (2006.01)
(52) U.S. Cl. ........ 455/137; 455/132; 455/272; 455/273; 455/278.1; 455/101; 375/346; 375/347; 375/348; 375/349; 375/350
(58) Field of Classification Search .................... 455/83, 455/101, 132, 140, 141, 143, 524, 137–139, 455/272–275, 276.1, 277.1, 277.2, 278.1; 375/130, 233, 347, 346, 348, 349, 350; 342/378; 340/870.12
See application file for complete search history.

(56) References Cited

U.S. PATENT DOCUMENTS

| | | | | |
|---|---|---|---|---|
| 4,734,701 A * | 3/1988 | Grobert | .......................... | 342/380 |
| 5,715,525 A * | 2/1998 | Tarusawa et al. | ............. | 455/101 |
| 5,844,951 A * | 12/1998 | Proakis et al. | ................ | 375/347 |
| 6,141,371 A * | 10/2000 | Holmes et al. | ................ | 375/130 |
| 6,603,427 B2 * | 8/2003 | Cai et al. | ........................ | 342/378 |
| 6,650,702 B1 * | 11/2003 | Steele | ........................... | 375/233 |
| 6,658,263 B1 * | 12/2003 | Ke et al. | ........................ | 455/524 |
| 6,844,850 B1 | 1/2005 | Lin | | |
| 6,937,677 B2 * | 8/2005 | Strolle et al. | ................... | 375/347 |
| 7,398,067 B2 * | 7/2008 | Wolf | .............................. | 455/137 |
| 7,573,398 B2 * | 8/2009 | Hoctor et al. | ............ | 340/870.12 |
| 2004/0146127 A1 | 7/2004 | Kent et al. | | |
| 2005/0181752 A1 * | 8/2005 | Sahota | .......................... | 455/132 |
| 2005/0227631 A1 * | 10/2005 | Robinett | ......................... | 455/83 |
| 2006/0073802 A1 | 4/2006 | Chari et al. | | |
| 2007/0002961 A1 * | 1/2007 | Hoctor et al. | ................. | 375/267 |
| 2007/0242784 A1 * | 10/2007 | Sampson et al. | .............. | 375/347 |

OTHER PUBLICATIONS

Cavell, Mertz & Davis, Inc. Consulting Engineers and Sirius Satellite Radio Engineering, Interference to the SDARS Service from WCS Transmitters, Technical White Paper, Mar. 28, 2006, p. 1-44, USA.
Compatibility of Services Using WiMAX Technology with Satellite Services in the 2.3-2.7 GHz and 3.3-3.8 GHz Bands, WiMAX Forum, Copyright 2007 WiMAX Forum White Paper, p. 1-49.

(Continued)

*Primary Examiner* — Junpeng Chen
(74) *Attorney, Agent, or Firm* — Volpe and Koenig, P.C.

(57) ABSTRACT

Methods and apparatus for implementing a wireless communication transceiver having receive path performance diversity. The transceiver implements a plurality of signal paths that can be configured as space diversity receive paths. Each of the plurality of signal paths includes a distinct RF filter. Each RF filter can be configured to provide a distinct frequency response, and in particular, a distinct jammer rejection profile. One of the RF filters can be configured to provide substantially no in-band jammer rejection. Each additional distinct RF filter can be configured to reject at least one distinct in-band jammer frequency or band of frequencies. A diversity receiver coherently combines the path performance diverse signals from each filter output. A transmitter can time division duplex transmit communications over at least a subset of the signal paths and their associated RF filters.

31 Claims, 9 Drawing Sheets

OTHER PUBLICATIONS

Cavell, Mertz & Davis, Inc. Consulting Engineers and Sirius Satellite Radio Engineering, "Interference to the SDARS Service from WCS Transmitters," Technical White Paper, pp. 1-44 (Mar. 28, 2006).

"Compatibility of Services using WiMAX Technology with Satellite Services in the 2.3-2.7 GHZ and 3.3-3.8 GHZ Bands," WiMAX Forum White Paper, pp. 1-49 (2007).

* cited by examiner

TRANSCEIVER WITH RECEIVE AND TRANSMIT PATH PERFORMANCE DIVERSITY

BACKGROUND

1. Field of the Invention

The invention concerns methods, apparatus, and systems for a wireless transceiver with receive and transmit path performance diversity.

2. Related Art

Wireless communication devices typically operate in many different signal environments. Some operating environments permit high quality communication links supporting high data rates at relatively low transmit powers, while other environments permit only marginal quality communication links using relatively low data rates and requiring relatively high transmit powers. In other embodiments, a wireless communication device may utilize a high transmit power in order to support high data rates, or may support a low data rate at a relatively low transmit power.

The operating environment experienced by a wireless communication device may be largely determined by natural phenomena, such as the proximity of participants in a communication link, terrain, obscurations, weather conditions, and the like. Operating environments may also be largely affected by man-made phenomena, such as interference sources, spurious emissions, unintentional jammers, and the like.

The spectral proximity of the operating frequency band of the wireless communication device to frequency bands having potentially large interference sources can be used in estimating the potential adverse effects attributable to the out of band interference sources. Unfortunately, the operating frequency band of the wireless communication device may not be contiguous, and may be interrupted by one or more bands having potentially large interference sources. A receive front end in a wireless communication device typically spans the entire operating band. Even if multiple receive front end portions are aggregated to support an entire operating band, typically at least one front end portion is responsive to signals from an out of band interference source in a band adjacent to the operating frequency band. A front end device that is responsive to out of band interference source may operate with degraded performance in the presence of the out of band interference source. For example, an amplifier may be driven to a nonlinear mode in the presence of a strong out of band interference source.

The ability of a wireless communication device to filter out or otherwise attenuate potential large interference sources depends upon the design margins available for the receiver. Front end filters used to reject out of band interference sources typically introduce attenuation in the desired pass band. Typically, cascading multiple filters to provide rejection of all potential out of band interference sources results in the introduction of a substantial amount of attenuation into the receive front end. Increasing the amount of attenuation in a receive front end is typically not desirable, as it increases the noise figure of the receiver and reduces the corresponding receiver sensitivity.

However, providing substantially no filtering of out of band interference sources exposes the receiver in the wireless communication device to the out of band interference sources. An out of band interference source having substantially larger transmit power than a desired signal can operate, in essence, as a jammer.

An out of band jammer signal can cause a gain control loop within the receiver to reduce the gain applied to receive signals, which can desensitize the receiver to desired signals. Furthermore, an out of band jammer signal can result in the receive front end being driven to a nonlinear state. The large jammer signal can effectively capture the receiver making it virtually useless for receiving the desired signal. The receive front end can generate substantial distortion products, including potentially in band intermodulation distortion products when operated in the nonlinear state. The in-band distortion products cannot be removed using conventional filtering.

A transmitter portion of the wireless communication device operates under similar but complementary constraints. The out of band emissions from the transmitter portion may be constrained over the entire operating range of the transmitter.

The design of the wireless communication device may be further complicated in wireless communication devices that time division duplex transmit and receive portions over a shared RF path. In such a device, the filtering implemented to satisfy the out of band transmit emissions constraints may adversely affect the sensitivity of the receiver portion. Similarly, filtering introduced to alleviate effects of out of band interference sources on the receiver portion may introduce additional attenuation into the transmit path resulting in a substantial loss of transmit power.

Therefore, it is desirable to control the effects of out of band interference sources on a receiver while maintaining the out of band emissions constraints on a transmitter.

BRIEF SUMMARY

Methods and apparatus for implementing a wireless communication transceiver having receive path performance diversity. The transceiver implements a plurality of signal paths that can be configured as space diversity receive paths. Each of the plurality of signal paths includes a distinct RF filter. Each RF filter can be configured to provide a distinct frequency response, and in particular, a distinct jammer rejection profile. One of the RF filters can be configured to provide substantially no in-band jammer rejection. Each additional distinct RF filter can be configured to reject at least one distinct in-band jammer frequency or band of frequencies. A diversity receiver coherently combines the path performance diverse signals from each filter output. A transmitter can time division duplex transmit communications over at least a subset of the signal paths and their associated RF filters. The one or more RF filters can operate to reduce or otherwise substantially eliminate out of band transmit emissions.

Receive path performance diversity enables a receiver to operate across a frequency band that may include one or more predetermined jammer signals. The plurality of receive signal paths are configured such that at least one receive path continues to operate satisfactorily in the presence of a predetermined jammer. Each receive path can implement, for example, one or more notch filters positioned at one or more corresponding predetermined jammer frequencies. Each notch filter typically contributes some insertions loss to the receive signal path. The receiver minimizes the loss of sensitivity associated with the increased insertion loss, while maintaining the ability to operate in the presence of jammer signals, by distributing the jammer frequency filtering across the plurality of receive paths. In one embodiment, the receiver includes one path which does not include notch filtering and, hence, does not include the corresponding pass band insertion loss, and therefore has enhanced performance under very low signal level conditions in the absence of jammers.

Aspects of the invention include a method of receive path performance diversity. The method includes receiving a first signal in a first signal path, filtering the signal in the first signal path with a first jammer rejection profile to generate a first filtered signal, receiving a second signal in a second receive path, filtering the signal in the second receive path with a second jammer rejection profile distinct from the first jammer rejection profile to generate a second filtered signal, and combining a first path signal based on the first filtered signal with a second path signal based on the second filtered signal.

Aspects of the invention include a method of receive path performance diversity. The method includes receiving signals using a plurality of antennas, filtering each received signal from an antenna of the plurality of antennas with a corresponding distinct jammer rejection profile, and combining signals derived from filtering each received signal.

Aspects of the invention include an apparatus having receive path performance diversity. The apparatus includes a first antenna configured to receive signals in an operating band, a second antenna configured to receive signals in the operating band, a first filter coupled to the first antenna and configured to provide a first jammer rejection profile, a second filter coupled to the second antenna and configured to provide a second jammer rejection profile distinct from the first jammer rejection profile, and a combiner coupled to the first and second filters and configured to combine signals based on filtered signals output from the first and second filters.

Aspects of the invention include an apparatus having receive path performance diversity. The apparatus includes a first RF signal path having a first jammer rejection profile, a second RF signal path having a second jammer rejection profile distinct from the first jammer rejection profile, a first receiver configured to process a signal received via the first RF signal path to generate a first receive output signal, a second receiver configured to process a signal received via the second RF signal path to generate a second receive output signal, and a combiner configured to combine the first receive output signal with the second receive output signal.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

DETAILED DESCRIPTION OF EMBODIMENTS OF THE INVENTION

Figure 1:
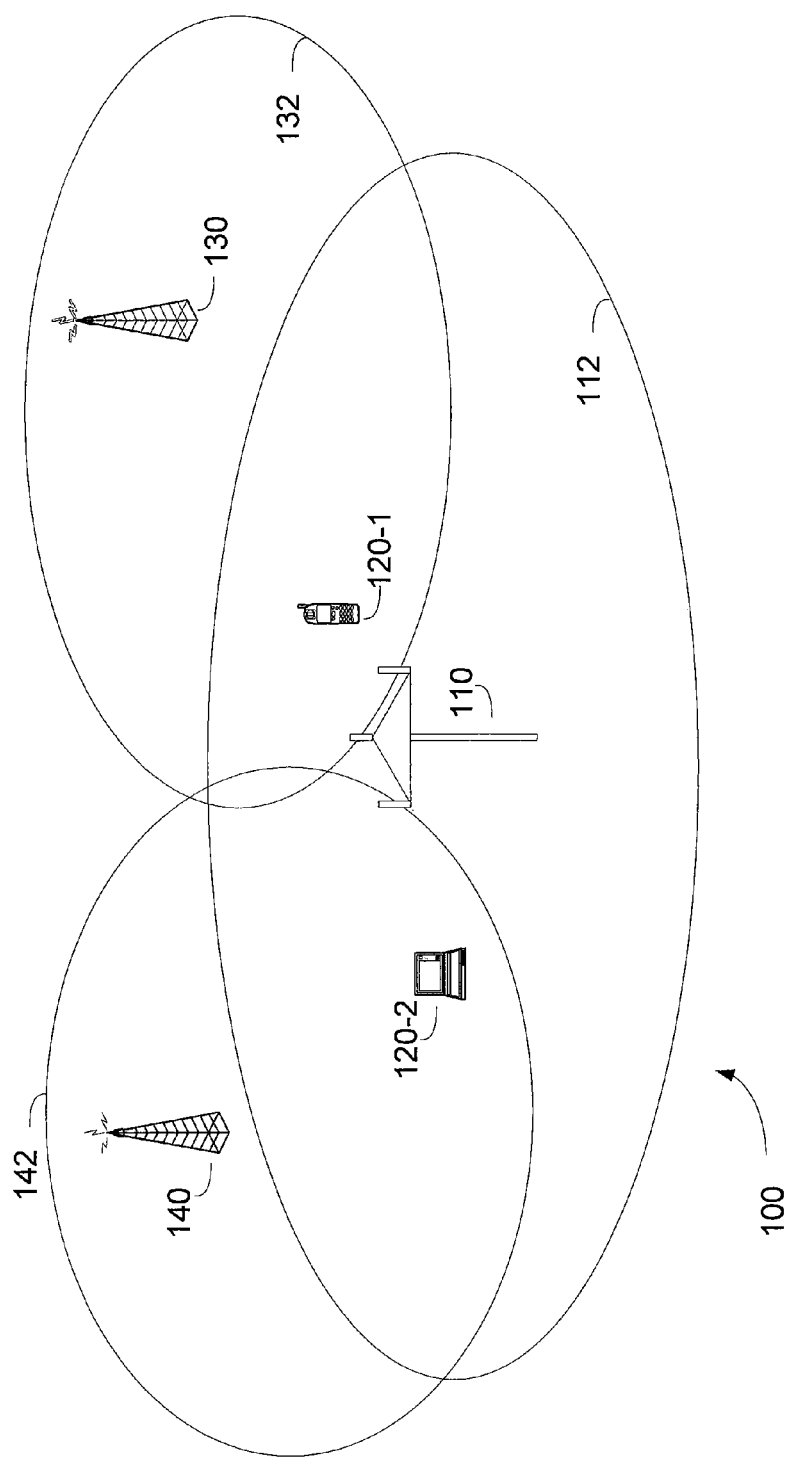
FIG. 1 is a simplified functional block diagram of an embodiment of a wireless communication system operating in the presence of potential jammers.

A wireless communication transceiver can simultaneously control the effects of out of band interference sources while maintaining satisfactory out of band transmit emissions constraints using multiple parallel receive paths implementing receive path performance diversity. The transmit signals can be Time Division Duplexed (TDD) across a selected one or more of the parallel receive paths, depending on the operating parameters associated with the transmit signal. Alternatively, the transmit signals can be Frequency Division Duplexed (FDD) using one or more distinct transmit signal paths.

The transceiver can implement receive path performance diversity using a plurality of substantially parallel receive paths. The plurality of substantially parallel receive paths can operate to concurrently receive signals, and the output from the plurality of substantially parallel receive paths can be coherently combined.

Each of the substantially parallel receive paths introduces a distinct frequency profile, and in particular, a distinct jammer rejection profile. In one embodiment, one receive path may include substantially no rejection of jammer signals, while other receive paths may include a jammer rejection profile that substantially rejects or otherwise filters at least one predetermined jammer signal or jammer frequency band. The insertion loss associated with the filters implementing the jammer rejection profiles desensitizes the associated filtered receive path relative to the receive path having substantially no rejection of jammer signals.

The receive path having substantially no rejection of jammer signals exhibits the best receive signal sensitivity, due in part to a lack of insertion loss associated with a filter implementing a jammer rejection profile. However, the unfiltered path likely performs poorly in the presence of strong jamming signals.

In another embodiment, each of the receive paths includes a distinct jammer rejection profile that substantially rejects or otherwise filters at least one predetermined jammer signal or jammer frequency band. Each receive path can provide a jammer rejection profile that rejects less than all of predetermined jammer signals, and no two receive paths share the same jammer rejection profile.

In one embodiment, each receive path can perform with substantially the same sensitivity under insignificant jammer conditions. The insertion loss associated with achieving filtering of a set of predetermined jammer signals is essentially distributed across the plurality of substantially parallel receive paths. Each path is slightly desensitized due to the insertion loss associated with its jammer filter, but at least one receive path provides improved signal quality under active jammer conditions, provided the corresponding jammer rejection profile rejects the active jammer signal.

The wireless transceiver can capitalize on the distributed jammer profiles and the associated decrease in overall insertion loss, particularly where the transmitter and receiver share at least the jammer filter circuitry. A transmitter can selectively route a transmit signal to one or more parallel transmit signal paths, where each transmit signal path passes through a jammer filter used by a receive path.

The wireless transceiver can selectively route or activate a particular transmit path based on one or more transmit operating parameters. The transmit operating parameters can include, for example, a transmit frequency, a proximity of the transmit frequency to a constrained emissions band, an insertion loss of a particular jammer filter, a desired transmit power, and the like, or some combination thereof.

FIG. 1 is a simplified functional block diagram of an embodiment of a wireless communication system 100 operating in the presence of potential jammer sources 130, 140. The wireless communication system 100 is illustrated as including a base station 110 supporting a corresponding coverage area 112. The coverage area 112 is depicted as substantially uniform, but such a coverage area is not a limitation. The base station 110 can support the coverage area 112 using one or more antennas configured to provide substantially omnidirectional coverage. Alternatively, the base station 110 can use one or more antennas, where each antenna or subset of antennas is configured to support a portion of the entire coverage area 112, such as a sector. The base station 110 can operate, for example, as an access point, gateway, portal, and the like to a network (not shown).

Although only a single base station 110 is shown in FIG. 1, the wireless communication system 100 can include a plurality of base stations 110, and each base station 110 may be configured similarly. The aggregate of the coverage areas corresponding to the plurality of base stations defines the coverage area of the system 100.

One or more subscriber stations 120-1 and 120-2 can be positioned within the coverage area 112. The base station 110 can manage one or more communication links with the subscriber stations 120-1 and 120-2. A subscriber station 120-1 or 120-2 can be a fixed station or can be a portable or otherwise mobile station that is capable of relocation.

The wireless communication system 100 can be configured to operate in an operating band that can include one or more band portions. The band portions can be contiguous or can be disjoint. The operating band can include shared transmit and receive operating bands or can include distinct transmit and receive operating bands.

Regardless of the operating band configuration, there can be one or more predetermined frequencies or frequency bands in which a potential interference source may originate. An interference source that has the capability to broadcast at transmit powers that are substantially greater than a power of a desired signal can be referred to as a jammer. In general, a jammer can be any interference source, and a jammer can intentionally or unintentionally operate to jam or otherwise substantially degrade communications within the operating band.

Typically, a jammer is a predetermined interference source operating at a predetermined jammer frequency or frequency band that can unintentionally degrade communications at one or more subscriber stations 120-1 and 120-2. The jammer frequency bands may be predetermined and may lie near or even inside the band edge of one or more of the band portions.

FIG. 1 illustrates two potential jammer sources 130 and 140, each having a corresponding jammer range 132 and 142, respectively. Although the potential jammer sources 130 and 140 are described in the context of unintentional interference sources, each jammer source, e.g. 130, may be a communication terminal, broadcast source, beacon, and the like that generates a signal that may be used by one or more subscriber stations 120-1 or 120-2. For example, a first jammer source 130 can be a base station for an alternative communication system, which may be supported by a multi-mode subscriber station. Alternatively, the first jammer source 130 can be a broadcast transmitter for a communication service that can be received by a multi-mode subscriber station. The jammer source 130 or 140 is not limited to a signal source that is never intended for a subscriber station 120-1 or 120-2, but instead, refers to an interference signal source that potentially interferes with communications in the wireless communication system 100.

A first jammer source 130 can transmit a jamming signal across a first affected area 132 that can at least partially overlap a coverage area 112 of the wireless communication system 100. The first affected area may not correspond to a service area associated with a communication system using the first jammer 132. Instead, the first affected area 132 refers to the area over which transmissions from the first jammer source 130 interfere with communications in the wireless communication system 100. The first jammer source 130 operates at a predetermined frequency or within a predetermined frequency band.

Similarly, a second jammer source 140 can transmit a jamming signal across a second affected area that can at least partially overlap a coverage area 112 of the wireless communication system 100. The second jammer source 140 operates at a predetermined frequency or within a predetermined frequency band that can overlap or be distinct from that of the first jammer source 130. The affected areas 132 and 142 can overlap or may be distinct.

A first subscriber station 120-1 can be within the coverage area 112 of the base station 110 and can establish a communication link with the base station 110. The first subscriber station 120-1 can also be in the first affected area 132 corresponding to the first jammer source 130. The first subscriber station 120-1 can implement a receiver with path performance diversity in order to enable operation in the presence of a jammer signal from the first jammer source 130, while maintaining receiver sensitivity when operating in the absence of any jammer. For example, because the jammer frequency or frequency band is predetermined, one receive path in the first subscriber station 120-1 can be built to reject or, in other words, "notch out" the jammer signal from the first jammer source 130.

Similarly, a second subscriber station 120-2 can be within the coverage area 112 of the base station 110 and can establish a communication link with the base station 110 and can also be in the second affected area 142 corresponding to the second jammer source 140. The second subscriber station 120-2 can similarly implement a receiver with path performance diversity in order to enable operation in the presence of a jammer signal from the second jammer source 140, while maintaining receiver sensitivity when operating in the absence of any jammer.

The path diversity receiver in each of the first and second subscriber stations, 120-1 and 120-2, can include a receive path that has a filter to substantially reject both the first and second jammer source 130 and 140 signals, or can include distinct receive paths, where a first receive path includes a filter that substantially rejects the signal from the first jammer source 130 and a second receive path that substantially rejects the signal from the second jammer source 140. If the affected areas 132 and 142 overlap, as shown in FIG. 1, it may be preferable to include a receive path that rejects both jammer signals. Alternatively, if it is unlikely that a subscriber station, 120-1 or 120-2, would concurrently experience multiple jammer signals, it may be preferable to implement distinct receiver paths, each having a filter to reject a single jammer signal.

Figure 2:
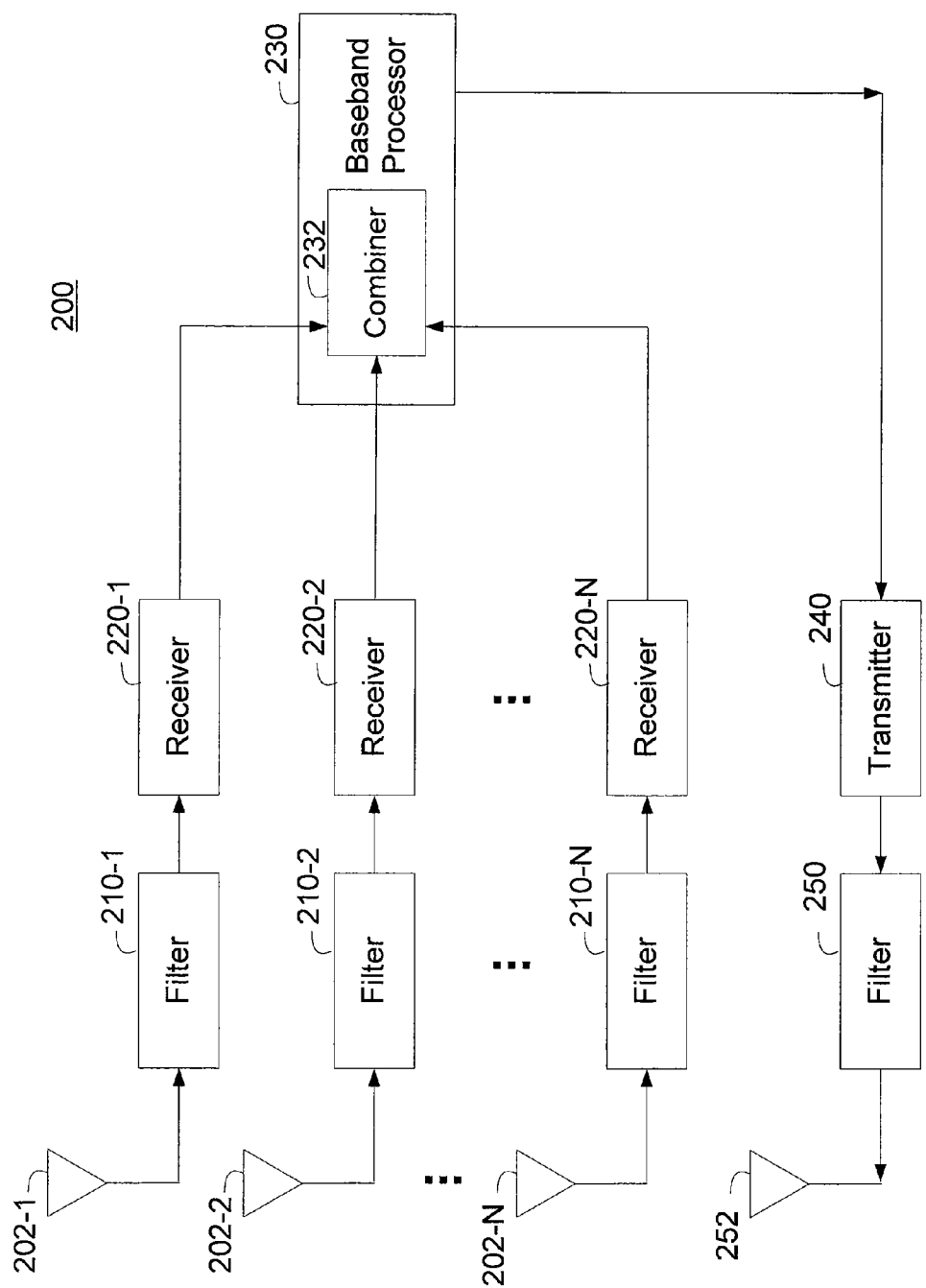
FIG. 2 is a simplified functional block diagram of an embodiment of a transceiver with receive path performance diversity.

FIG. 2 is a simplified functional block diagram of an embodiment of a transceiver 200 with receive path performance diversity. The transceiver 200 can be implemented, for example, within a subscriber station of FIG. 1. Although the transceiver 200 could also be integrated within the base station of FIG. 1, the mobile nature of a subscriber station typically makes its receive environment more dynamic, and subject to a wide range of environments.

The transceiver 200 includes a plurality of receive paths, with each receive path implementing a distinct jammer rejection profile. The transceiver 200 also includes a transmit path to enable communications from the transceiver 200 to a destination device, such as a base station. Although FIG. 2 depicts the transmit path as distinct from any receive paths, in other embodiments the transmit path may share a portion of one or more receive paths.

The transceiver 200 can implement receive path performance diversity alone or can implement receive path diversity in combination with other diversity techniques. For example, the structure of the parallel receive paths permits relatively straight forward implementation into a transceiver implementing space diversity, space time diversity, frequency diversity, and the like or some combination thereof.

A first receive path includes a first antenna 202-1 coupled to a first filter 210-1 configured to provide a first jammer rejection profile. The first jammer rejection profile can operate to reject or otherwise attenuate one or more predetermined jammer frequencies or jammer frequency bands. The output from the first filter 210-1 is coupled to a first receiver 220-1. The first receiver 220-1 can be configured, for example, to amplify, further filter, frequency convert, and convert to digital the received signal.

The output from the first receiver 220-1 is typically a digitized baseband signal but is not limited to such a signal. The output of the first receiver 220-1 is coupled to an input of a baseband processor 230.

A second receive path operates similar to the first receive path. A second antenna 202-2 couples a receive signal to a second filter 210-2 that is configured to provide a second jammer rejection profile. The output from the second filter 210-2 is coupled to a second receiver 220-2. The output from the second receiver 220-2 is coupled to a second input of the baseband processor 230.

The transceiver 200 implements additional substantially parallel receive paths, up to an Nth receive path. FIG. 2 depicts the number of independent receive paths, N, as greater than two. However, the number of independent receive paths, N, can be any positive integer greater than one.

The Nth receive path is configured similar to all other receive paths. An Nth antenna 202-N couples a receive signal to an Nth filter 210-N that is configured to provide an Nth jammer rejection profile. The output from the Nth filter 210-N is coupled to an Nth receiver 220-N. The output from the Nth receiver 220-N is coupled to an Nth input of the baseband processor 230.

Each filter 210 is configured with a distinct jammer rejection profile. In one embodiment, each filter is configured to reject a distinct one or combination of the predetermined jammer frequencies or jammer frequency bands.

In another embodiment, one of the filters 210 is configured to have substantially no rejection of predetermined jammer frequencies. In such an embodiment, each of the remaining filters 210 could be configured to reject at least one of the predetermined jammers.

A filter can be configured to reject a predetermined jammer frequency or band of jammer frequencies using a band reject or notch configuration. A band reject filter can operate to reject jammers within a band of frequencies, while a notch filter can be configured to reject a jammer signal at or near a very narrow frequency range.

In one embodiment, the notch filter can be implemented, for example, as a low-Q deep notch at a predicted jammer frequency. The notch can be implemented as a low-Q notch in order to allow for frequency offsets that may be attributable to manufacturing tolerances, Doppler, temperature drift, and the like, or some combination thereof. Any band reject or notch filter inserted into a receive signal path typically introduces an insertion loss penalty. A notch may be designed to have a width and depth that is just sufficient to attenuate the intended jammer signal in order to minimize the associated insertion loss in the frequency band of interest.

Inevitably, however, the jammer rejection filter causes some insertion loss in the frequency band of interest. In particular, deep notch filters introduce a frequency dependent insertion loss in the band of interest, typically causing more insertion loss as the passband frequency approaches the frequency of the notch. Due to this insertion loss, a receive path incorporating a jammer rejection filter is desensitized in the band of interest and, thus, has a degraded performance when the signal level is very low, regardless of whether a jammer is present.

One advantage of receive path performance diversity is that the paths can cover for one another under extreme operating conditions. For example, at a first frequency of interest at which a first path has degraded sensitivity due to insertion loss in the passband caused by a notch filter at a first jammer frequency, a second path which does not incorporate the same notch filter will have better sensitivity. Thus, under low signal level conditions in the absence of jammers, the second path provides better performance at the first frequency of interest than the first path.

However, under more moderate signal level conditions and in the presence of jammers at the first jammer frequency, the first path provides better performance than the second path. The second receive path performs poorly under these conditions because the jammer power can capture the second receive path. When captured, the second receive path components may operate in a nonlinear mode, which may introduce in-band and out-of-band spurs as well as signal distortion. In addition, the jammer energy can also capture the automatic gain control mechanism so that the power level of the desired signal at the input to the baseband processor is small in comparison to ideal signal levels. In contrast, the notch filter in the first path rejects the jammer power and the first receiver path continues to operate effectively.

Providing a signal path having substantially no jammer rejection can be advantageous because such a path typically has the best noise figure and, thus, increased sensitivity. However, such a path is also the most likely path to become captured in the presence of jammers.

When signals output by the multiple performance diverse receive paths are combined according to one of several techniques, the combined signal may rely more heavily on the path which is performing well under the current operating conditions. For example, using maximum ratio combining, the signals are weighted before combining. Strong and undistorted signals are weighed more heavily than low power, noisy or distorted signals. Thus, a maximum ratio combiner will weigh the first path signal more heavily when the second path has been captured by a jammer and is thus producing a noisy and distorted signal. The maximum ratio combiner will weigh the second path signal more heavily under low signal level conditions and in the absence of jammers because the better noise figure of the second path produces a less noisy signal than the first path.

The receivers 220 can be similarly configured or can be configured to support a particular diversity implementation. For example, where the transceiver 200 supports time diversity, each receiver 220 can be configured to receive a distinct time of arrival. Where the transceiver 200 supports frequency diversity, each receiver 220 can be configured to tune to a distinct receive frequency. The receivers 220 may be configured in other ways to support other diversity techniques.

The baseband processor 230 operates to coherently combine the outputs from the independent receive paths. The result of the coherent combination should be an improved signal quality. The coherent combination is illustrated functionally as a combiner 232. The combiner 232 can be configured to simply sum all of the receiver outputs. In other embodiments, the combiner 232 can be configured to time align the signals prior to combination or can be configured to further process one or more of the signals prior to combination.

The combiner 232 can operate directly on the signals output from the receivers 220, or the signals from the receivers 220 can be further processed prior to combining. Additional signal processing can be performed, for example, by the baseband processor 230, the combiner 232, or some combination thereof.

In one embodiment, the baseband processor 230 is configured to further process the signals from the receivers 220 prior to combining. The baseband processor 230 can be configured, for example, to equalize, demodulate, correlate, or otherwise process the signals prior to combining.

In one embodiment, the transceiver 200 is configured to receive OFDM signals when in the receive mode. Each of the receivers 220 can be configured to generate a corresponding baseband signal and couple the baseband signal to the baseband processor 230. The baseband processor 230 can be configured to transform the baseband OFDM symbols to the subcarriers using, for example, a transform module that can include a Fast Fourier Transform (FFT) engine (not shown). The baseband processor 230 can also be configured to generate a channel estimate for each received signal. The combiner 232 can operate on the transformed signals in conjunction with the associated channel estimates to maximize the combined signal quality.

The baseband processor 230 can be configured to further process the received signals, or can be configured to route the signals to another module (not shown) for further processing. For example, the baseband processor 230 can be configured to synchronize, demodulate, extract, or otherwise process the received signals.

The baseband processor 230 can be configured to utilize the received signals or can be configured to route the received signals to associated destination devices or ports (not shown). Similarly, the baseband processor 230 can operate to receive baseband signals and process them for transmission on an uplink channel to the base station.

The baseband processor 230 processes the uplink signals and couples them to a transmitter 240. The transmitter 240 filters, amplifies, and frequency converts the baseband signal to a transmit operating frequency. The transmitter 240 couples the transmit signal to a transmit filter 250 for RF filtering. The transmit filter 250 can be configured to provide the transmit mask filter that operates to reduce or otherwise attenuate any transmit signal components that lie within a reduced or otherwise constrained emissions band. The filtered transmit signal is coupled to a transmit antenna 252 for transmission to the base station or some other destination device.

The transceiver 200 depicted FIG. 2 utilizes distinct filters and antennas for the receive and transmit paths. However, other embodiments may share portions of the RF signal paths between the receiver and the transmitter. Sharing a portion of the RF path may be typical in transceivers implementing shared operating bands, such as a transceiver that time division duplexes (TDD) the transmit and receive signals over the same operating band.

Figure 3A:
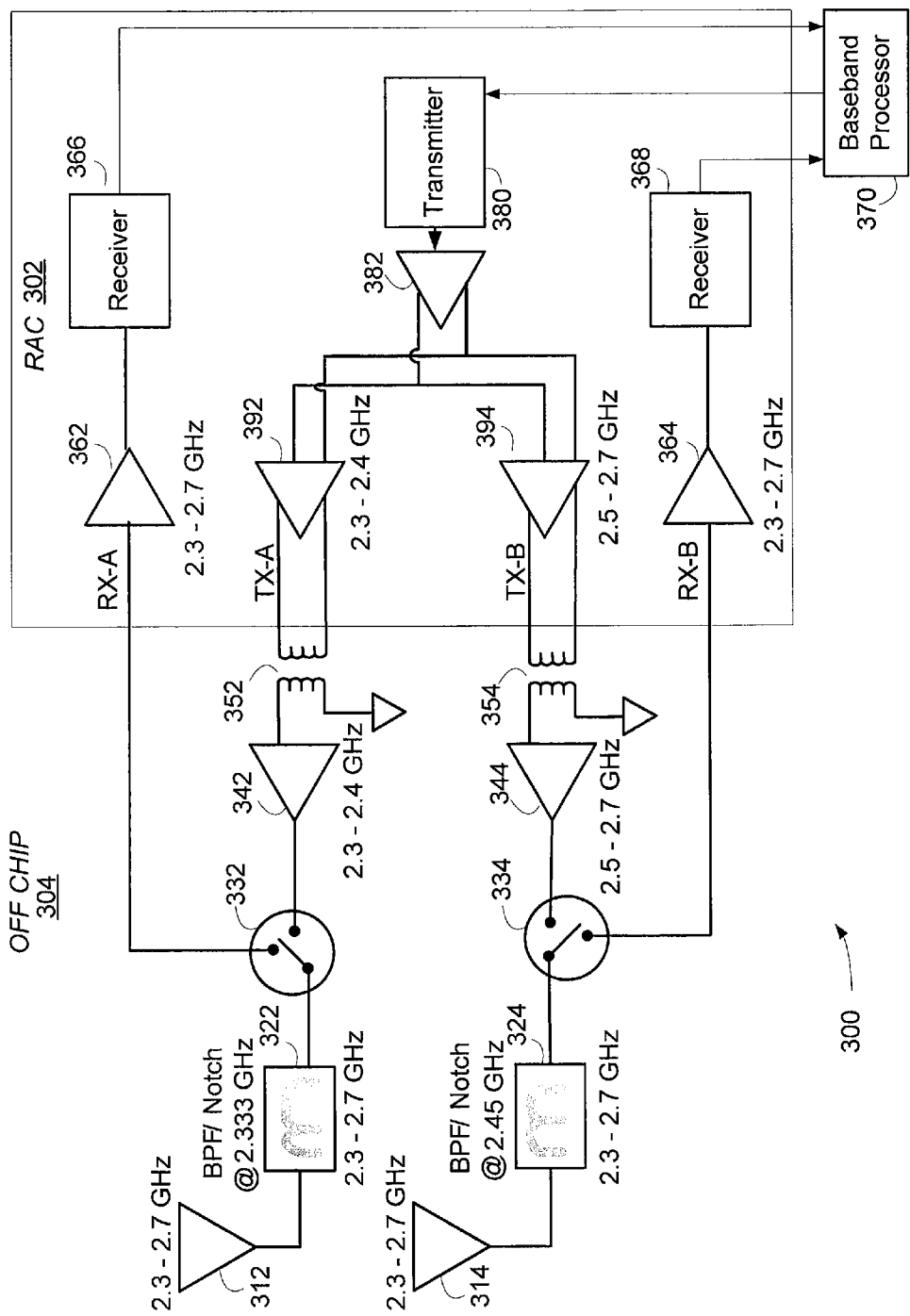
FIGS. 3A-3C are simplified functional block diagrams of embodiments of a transceiver with receive path performance diversity.

FIG. 3A is a simplified functional block diagram of an embodiment of a transceiver 300 with receive path performance diversity. The transceiver 300 can be a TDD transceiver implemented within a subscriber station of FIG. 1. The particular transceiver 300 illustrated in FIG. 3A is configured to support IEEE 802.16 Orthogonal Frequency Division Multiple Access (OFDMA) communications, typically referred to as WiMax communications. However, the techniques and methods described herein are not limited to application in the described system.

The transceiver 300 implementing the receive path diversity depicted in FIG. 3A ensures that at least one receive path remains linear even in the presence of one jamming signal in one of the predetermined jammer bands. Similarly, selectively routing the transit signal based on an operating parameter reduces or substantially eliminates out of band emissions.

The transceiver 300 receives concurrently in a plurality of substantially parallel receive paths, and can combine the received signals to improve the quality of the received signals. For example, the diversity receiver can implement maximal ratio combining, best path selection, equal gain combining, switch diversity combing, antenna selection and the like, or some other type of signal combining. The diversity receiver can implement receive path signal combining of RF signals, baseband signals, demodulated signals, or some other processed signal. For example, the diversity receiver operating on received Orthogonal Frequency Division Multiplex (OFDM) symbols can be configured to combine the receive signals from the distinct receive signal paths after frequency domain transformation of baseband signals and after channel estimation and compensation.

The transceiver 300 is configured as a RF analog integrated circuit (RAC) 302 in combination with an off-chip RF front end portion 304. The RF front end portion 304 includes signal processing paths that are shared between the transmit and receive portions of the transceiver 300.

The transceiver 300 is configured to support an operating frequency band of approximately 2.3-2.7 GHz that is operated in TDD fashion for transmit and receive operations. The operating frequency band is not contiguous, but instead, includes at least two distinct bands that can be the source of interfering signals.

A first interference or jamming band is centered at approximately 2.333 GHz and spans approximately 2.320-2.345 GHz. This interference band is used to support ground station repeaters for Digital Audio Radio (DAR). A DAR repeater can transmit at up to approximately 2 kW EIRP and thus can present a substantial jammer source to a transceiver 300 supporting the 2.3-2.7 GHz band.

In the same way that the DAR repeater causes potential interference to the transceiver 300, the transceiver 300 can cause unintended interfere to a DARs subscriber station receiver or terrestrial repeater station. Thus, the transceiver 300 must limit the power which it emits in the DAR band. Emissions in the DAR band are created by noise, spurs, inter modulation products, phase noise, baseband noise, quantization noise and the like which are produced unintentionally by the transceiver 300. The filter 322 can serve to reduce emissions in the DARs band.

A second interference or jamming band is centered at approximately 2.45 GHz and spans approximately 2.400-2.488 GHz. The second interference or jamming band can be used to support unlicensed communication systems, such as IEEE 802.11b/g communications or communications in accordance with the BLUETOOTH communications standard. Alternatively, the second interference band can support industrial, scientific and medical (ISM) purposes, such as for microwave ovens.

In the same manner unintentional emission are created in the DAR band, the transceiver 300 can cause unintended interference in the 2.400-2.488 GHz band. The government sets a limit on emissions in the second jammer band. The filter 344 can serve to reduce emissions in the band 2.400-2.488 GHz. The interference issue in this band is particularly vicious when a base station for the band of interest is co-located with a base station operating in the jammer band.

As with the DAR band and the 2.400-2.488 GHz band, in many cases, a jammer band is also a restricted emissions band. Thus, the subscriber station must carefully limit its transmit emissions in the same general frequency band in which it expects to see jammers. Thus, in one embodiment, the same notch filters that are used to provide jammer rejection and receive path performance diversity are used to restrict out-of-band emissions and provide transmit path performance diversity as well.

The RF front end portion 304 includes those portions of the transceiver 300 that are not typically implemented on an IC or that are not typically integrated with other transceiver functions. Of course, the receive path performance diversity is not limited to any particular division of on-chip and off-chip processes.

The RF front end portion 304 includes a first antenna 312 configured to receive signals during at least a receive portion of TDD operation. The first antenna 312 is coupled to a first filter 322 configured to provide a first jammer rejection profile. The first filter 322 can be configured, for example, to position a notch centered at approximately 2.333 GHz to attenuate potential jammer signals in the corresponding band. The first filter 322 can also be configured to provide general RF bandpass filtering of the operating band.

The first filter 322 is coupled to a first switch 332 that can be configured as a transmit/receive (T/R) switch. The first switch 332 is configured to selectively switch the first antenna 312 and first filter 322 to one of a transmit or receive signal path.

The first switch 332 couples the first filter 322 to a first receive amplifier 362 when controlled to the receive state. The first switch 332 couples the first filter 322 to an output of a first power amplifier (PA) 342 when controlled to the transmit state.

The first receive amplifier 362 amplifies the receive signal and couples the amplified signal to a first receiver 366 for additional processing. The first receive amplifier 362 has a frequency response that supports the entire operating frequency. The first receiver 366 couples the processed signal, which may be a baseband signal, to a baseband processor 370 for further processing and combining with the signal from the second receive path. The baseband processing 370 can be configured to perform virtually any type of signal combination and can be configured, for example, to perform maximal ratio combining.

A second RF path is configured similarly to the first RF signal path. A second antenna 314 is coupled to a second filter 324. The second filter 324 is configured to provide a second jammer rejection profile that is distinct from the jammer rejection profile provided by the first filter 322. For example, the second filter 324 is configured with a notch centered at approximately 2.45 GHz to substantially attenuate signals in the associated unlicensed or ISM band.

The second filter 324 is coupled to a second switch 334 that is configured as a T/R switch. When controlled to be in the receive position, the second switch 334 couples the second filter 324 to a second receive amplifier 364. The second receive amplifier 364 has a frequency response that supports the entire operating frequency. The output of the second receive amplifier 364 is coupled to a second receiver 368. The output of the second receiver 368 is coupled to the baseband processor 370 for combining with the signal from the first receive path. The second switch 334 couples the second filter 324 to an output of a second power amplifier 344 when controlled to the transmit state.

In transmit mode, the baseband processor 370 generates baseband transmit signals and couples the baseband signals to a transmitter 380 for processing to a RF transmit signal. The transmitter 380 couples the transmit signal to a transmit amplifier 382 that amplifies the transmit signal. The transmit amplifier 382 can be configured to substantially support the entire operating band.

The output of the transmit amplifier 382 is coupled to inputs of a first driver amplifier 392 and a second driver amplifier 394. The first driver amplifier 392 is configured to support a portion of the operating band. For example, the first driver amplifier 392 is configured to support the frequency band spanning approximately 2.3-2.4 GHz. Similarly, the second driver amplifier 394 is configured to support a portion of the operating band, and supports a portion of the operating band that is complementary to the portion supported by the first driver amplifier 392. For example, the second driver amplifier 394 can support the frequency band spanning approximately 2.5-2.7 GHz. The unsupported frequency band of 2.4-2.5 GHz corresponds approximately to the second jammer band.

The output of the first driver amplifier 392 is coupled to the input of the first PA 342 via a first transformer 352 that can be configured as a balun when converting a differential output from the first driver amplifier 392 to a single ended input of the first PA 342. The first PA 342 also supports a portion of the operating band, and supports the same portion of the operating band that the first driver amplifier 392 supports.

Similarly, the output of the second driver amplifier 394 is coupled to the input of the second PA 344 via a second transformer 354 that can be configured as a balun. The second PA 344 supports the portion of the operating band that the second driver amplifier 394 supports.

The transmit signal can be selectively routed to a transmit path based on the band of operation. Although the driver amplifiers 392 and 394 and PAs 342 and 344 are depicted as supporting only a portion of an operating band, the amplifiers can be configured to support the entire operating band, while maintaining the same criteria for selective routing of the transmit signal. The elements in the unselected transmit path can be de-energized or otherwise powered-down in order to reduce the total power consumption of the transceiver.

The transceiver 300 selectively routes the transmit signal to a transmit path based on one or more operating parameters of the transmit signal. In the embodiment of FIG. 3A, the operating parameter includes transmit frequency or transmit frequency band. The frequency response of the driver amplifiers 392 and 394 in conjunction with the frequency response of the PAs 342 and 344 provide additional filtering of the transmit signals and operate in conjunction with the filters 322 and 324 to reduce or substantially eliminate emissions in the restricted emissions band. The frequency response of the amplifiers can substantially reduce or eliminate transmit emissions in the furthest restricted emissions band, and the notch in the associated filter, 322 or 324, can operate to reduce or eliminate transmit emissions in the restricted emissions band near the supported portion of the operating band.

As noted above, the jammer rejection filter (which in this embodiment is also acting as a restricted emissions filter) causes some insertion loss in the frequency band of interest. In particular, the filters 322 and 324 introduce a frequency dependent insertion loss in the band of interest, typically causing more insertion loss as the passband frequency approaches the frequency of the notch. Due to this insertion loss, a transmit path incorporating a restricted emissions filter has a higher path loss from the output of the PA 342, 344 to the antenna 312, 314 and, thus, has either a resultant decrease in maximum output power or a higher power usage than would a path which did not incorporate such filtering.

Thus, the wireless transceiver 300 can selectively route or activate a particular transmit path based on one or more transmit operating parameters to meet the emission requirements in a restricted emissions band while optimizing power usage. The transmit operating parameters can include, for example, a transmit frequency, a proximity of the transmit frequency to a constrained emissions band, an insertion loss of a particular jammer filter, a desired transmit power, and the like, or some combination thereof. Thus, in the embodiment shown FIG. 3A, the transmitter 380 may select one of the transmit paths based upon the desired transmit power and the transmit frequency. As the transmit power increases, causing a corresponding increase in out-of-band emissions, and as the transmit frequency approaches the restricted emissions band, the transmitter 300 can activate a transmit path with more filtering and that, therefore, consumes more power. As the transmit power decreases and the transmit frequency moves away from the restricted emissions band, the transmitter 300 can activate a path with less filtering.

Figure 3B:
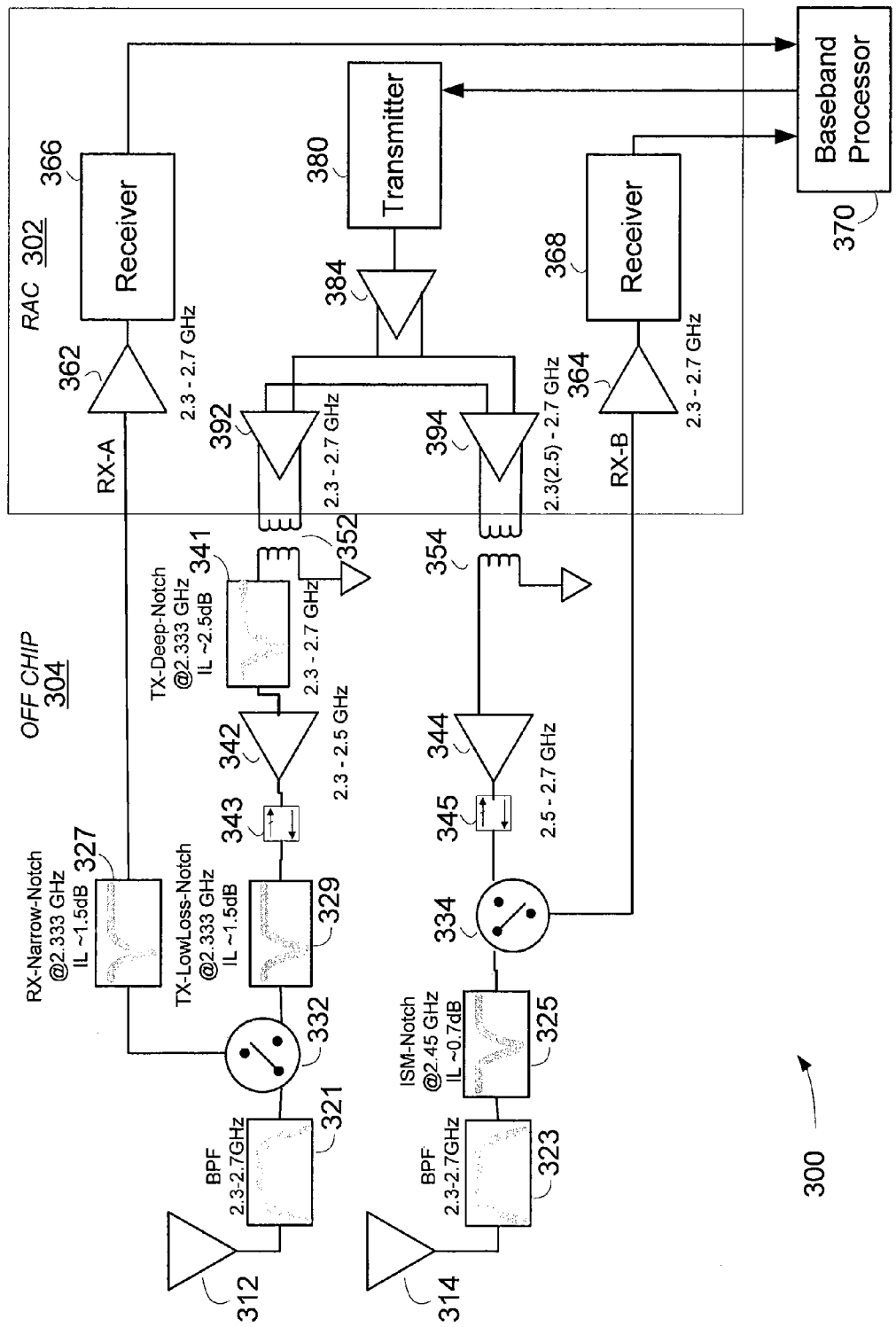

FIG. 3B is a simplified functional block diagram of another embodiment of a transceiver 300 with receive path performance diversity. The transceiver 300 of FIG. 3B is similar to the embodiment of FIG. 3A. The RF analog integrated circuit 302 and baseband processor 370 can be very similar if not virtually identical to those portions shown in FIG. 3A.

In the transceiver 300 of FIG. 3B, the filters are implemented as distinct bandpass and notch filters. The bandpass filters 321 and 323 provide filtering of the operating band and operate in combination with notch filters 325, 327, and 329. One bandpass filter 321 or 323 is positioned in each of the shared T/R signal paths.

The first switch 332 couples the first bandpass filter 321 to one of a first receive notch 327 or a low loss transmit notch 329. The output of the first receive notch 327 is coupled to a corresponding receive input of the RF analog integrated circuit 302.

The transmit path sharing the first antenna 312 divides the filtering into multiple parts and provides improved emission performance in the 2.333 GHz frequency band. A deep transmit notch 341 is coupled to the output of the first balun 352 and operates to provide significant filtering of phase noise, thermal noise, baseband noise, and quantization noise. However, the deep transmit notch 341 may have a relatively large insertion loss. The relatively high insertion loss associated with the deep transmit notch 341 may make it more desirable to position the deep transmit notch 341 in the transmit signal path prior to the first PA 342.

The output of the first PA 342 is coupled to a first circulator/isolator 343 that can operate to reduce the amount of received or reflected energy that is coupled to the output of the first PA 342. The output of the first PA 342 is coupled via the first circulator/isolator 343 to the input of the low loss transmit notch 329. The low loss transmit notch 329 provides additional filtering at an emissions band of interest, and provides filtering of PA thermal noise as well as reducing some spectral regrowth.

The transmit path sharing the second antenna 314 separates the filtering into a series combination of distinct bandpass filter 323 and notch filter 325. The output of the second PA 344 is coupled to the second switch 334 via a second circulator/isolator 345. Otherwise, the remainder of the second transmit and receive paths are identical to the signal paths illustrated in the transceiver of FIG. 3A.

Figure 3C:
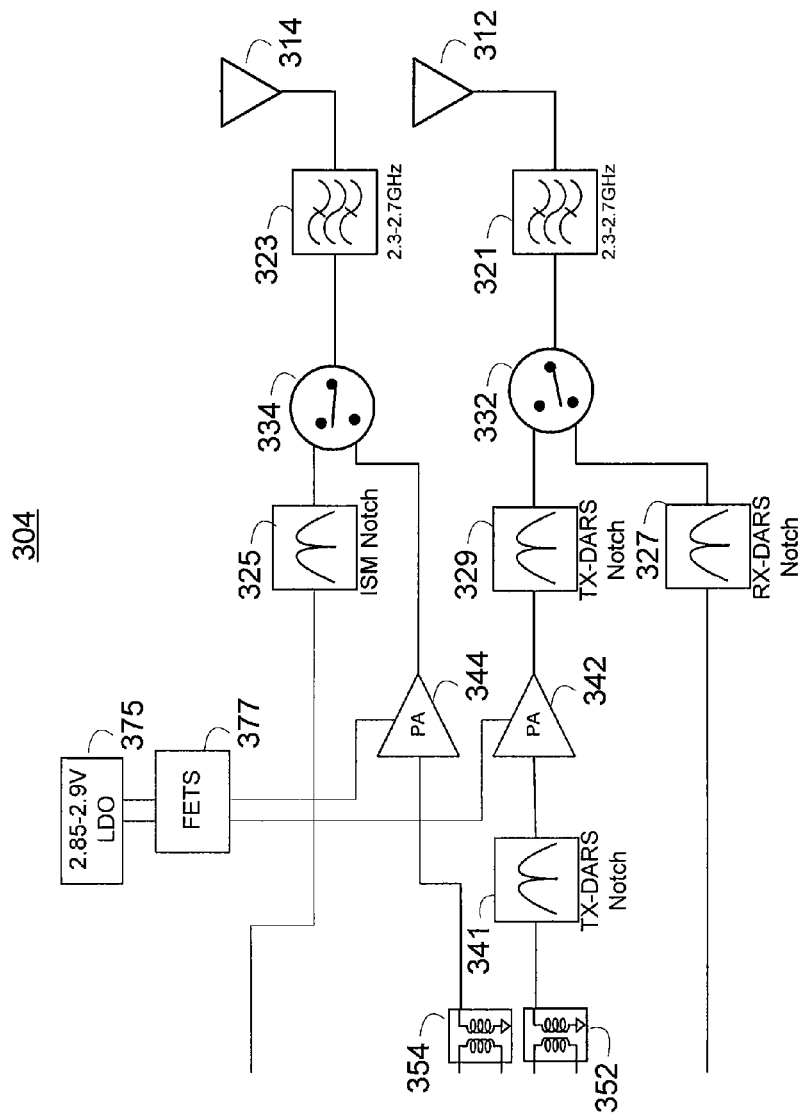

FIG. 3C is a simplified functional block diagram of an embodiment of a RF front end portion 304. The RF front end portion 304 can be implemented, for example, in the transceivers of FIG. 3A or FIG. 3B, replacing the RF front end portions shown in the respective figures.

In the embodiment of FIG. 3C, the shared transmit and receive signal paths of the RF front end portion 304 incorporate bandpass filters 321 and 323 having substantially no rejection of predetermined jammer frequencies. The jammer rejection/emission reduction is provided using distinct notch filters 325, 327, and 329.

The first switch 332 couples the first bandpass filter 321 to one of a transmit or receive path. The first switch 332 couples the first bandpass filter 321 to the first receive notch 327 when the first switch 332 is controlled to direct signals to a receive path.

A first balun 352 couple transmit signals to the deep transmit notch 341. The output of the deep transmit notch 341 is coupled to the first PA 342. A low loss transmit notch 329 couples the output of the first PA 342 to the first switch 332. The first switch 332 couples the filtered transmit signal to the first shared signal path when the first switch 332 is controlled to direct signals from the transmit path.

A second signal path includes a second antenna 314 that is coupled to a second bandpass filter 323. The second bandpass filter 323 is coupled to the second switch 334. The second switch can be controlled to couple the second bandpass filter to a second receive notch 325 when in the receive mode. The second switch 334 couples the second bandpass filter 323 to the second PA 344 when in the transmit mode.

The RF front end portion 304 also explicitly illustrates the selective energizing of the PAs 342 and 344. A power source 375, such as a linear regulator, low drop-out (LDO) regulator, switching power supply, and the like, can be used to energize the PAs 342 and 344. A controllable power switch 377, that can be implemented as a bank of FET switches or RF micro electrical mechanical (MEM) switch, can be selectively controlled to energize one or more of the PAs 342 or 344. For example, the controllable power switch 377 can be controlled to energize one of the first PA 342 or the second PA 344 based, at least in part, on the operating frequency of the transmit signal. The controllable power switch 377 can be configured to selectively de-energize all PAs 342 and 344 when operating in the receive mode.

The embodiments illustrated in FIGS. 3A-3C are not exhaustive of transceiver configurations, nor of receive path performance diversity configurations. Instead, the embodiments are provided to illustrate the various different configurations that can be used in a TDD transceiver utilizing just two distinct T/R signal paths. The frequencies noted in FIGS. 3A-3C are illustrative and the principles described herein can be directly applied to other frequency bands of interest and other expected jammer bands.

Figure 4:
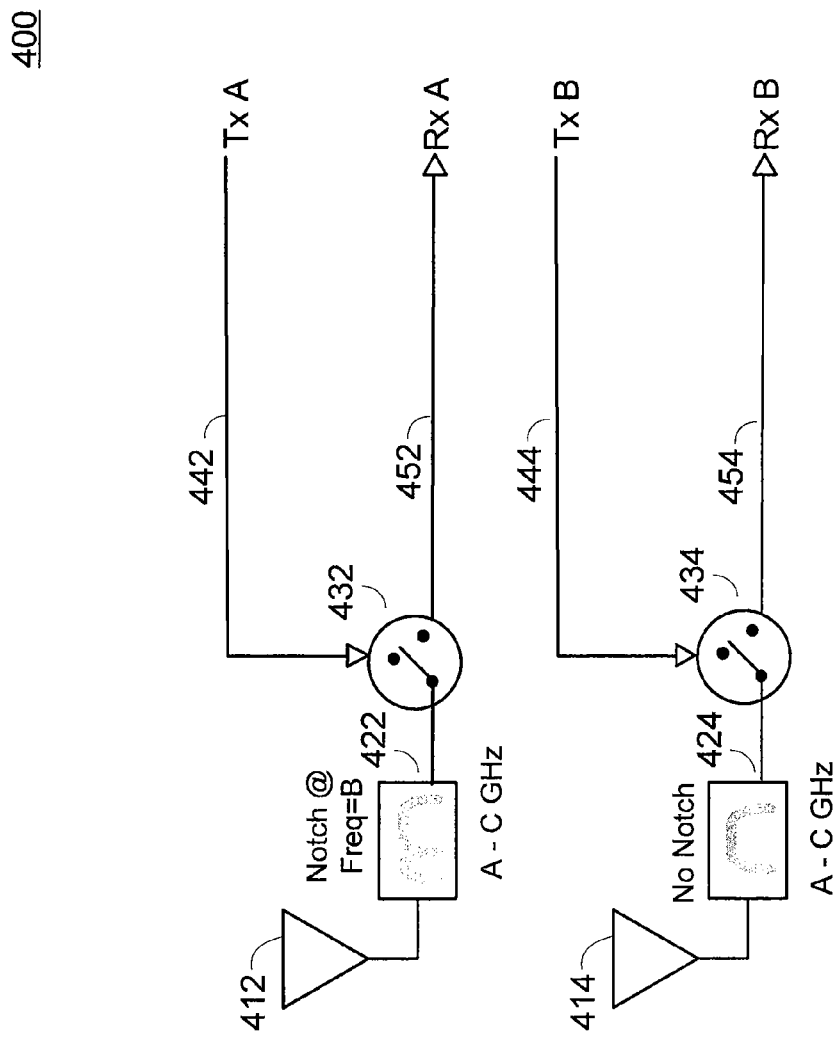
FIG. 4 is a simplified functional block diagram of an embodiment of a transceiver portion with receive path performance diversity.

FIG. 4 is a simplified functional block diagram of an embodiment of a transceiver portion 400 with receive path performance diversity. The simplified functional block diagram illustrates just the RF portion of a transceiver that may be implemented, for example, within a subscriber station of FIG. 1. The transceiver portion 400 can, for example, replace the RF portion of the transceiver of FIG. 3A. The transceiver portion 400 is configured for implementation in a transceiver that is configured to support TDD transmit and receive operation.

The transceiver portion 400 includes a first antenna 412 coupled to a first filter 422. The first filter 422 is configured with a jammer rejection profile that rejects at least one frequency or band or frequencies associated with predetermined jammers. For example, the first filter 432 is depicted as having a notch at a frequency, frequency B, that lies within the operating frequency band. The first filter 422 can also be configured to provide general RF bandpass filtering. The first filter 422 is coupled to a first switch 432 that operates as a T/R switch to selectively switch the first filter 412 to a first transmit path 442 or a first receive path 452.

A second antenna 414 is coupled to a second filter 424 that provides substantially no rejection of jammer frequencies or jammer frequency bands. The second filter 424 provides RF bandpass filtering of the operating band, but does not provide any additional filtering of predetermined jammer frequencies.

The output of the second filter 424 is coupled to a second switch 434 configured as a T/R switch. The second switch 434 selectively switches the second filter 424 to a second transmit path 444 or a second receive path 454.

Providing a signal path having substantially no jammer rejection can be advantageous where the addition of jammer rejection results in increased filter insertion loss. A filter implementing substantially no jammer rejection has minimal insertion loss, and thus, can support a maximum receiver sensitivity. Due to the insertion loss of the filter 422, the first receive path is desensitized compared to the second receive path. The first receive path has a degraded performance when the signal level is very low. The second receive path has a lower overall noise figure and performs better when the signal level is very low. But the second receive path performs poorly in the presence of a large expected jammer because the jammer power captures the second receive path. When captured, the second receive path components may operate in a nonlinear mode, which may introduce in-band and out-of-band spurs as well as signal distortion. In the first path, the jammer power is degraded or substantially attenuated by the first filter 422, and the first receive path continues to perform well in presence of the expected jammer.

The signals in the receive paths 452 and 454 can be processed and combined to improve the receive signal quality. Similarly, the transit signal can be selectively routed to one or both transmit paths based on one or more transmit operating conditions, that can include transmit power, transmit frequency, and the like.

Figure 5:
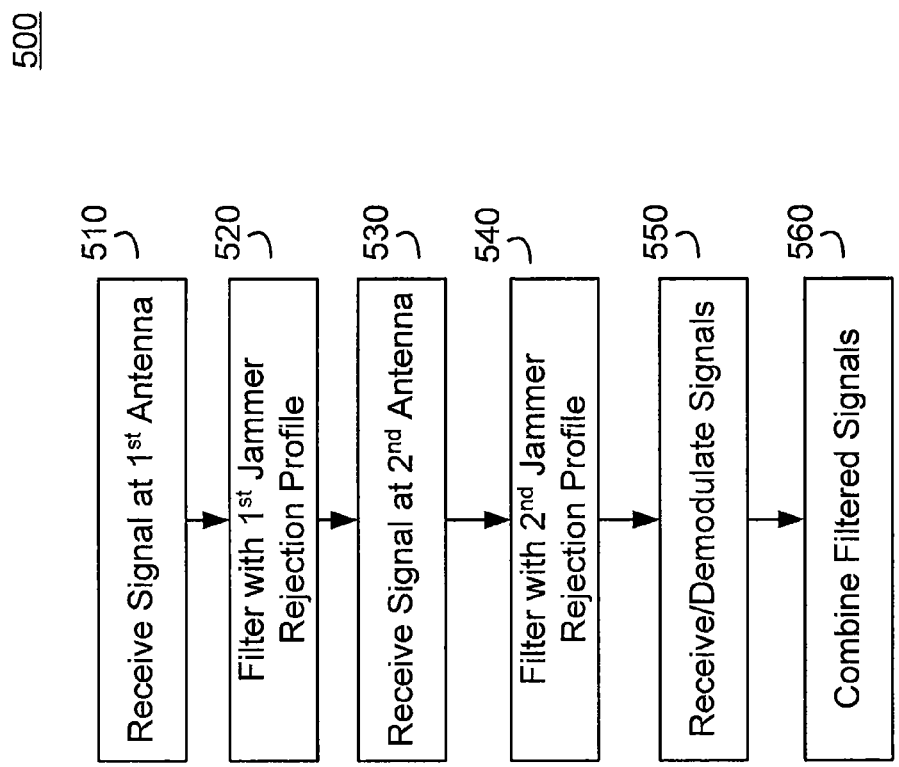
FIG. 5 is a simplified flowchart of an embodiment of a method of receive path performance diversity.

FIG. 5 is a simplified flowchart of an embodiment of a method 500 of receive path performance diversity. The method 500 can be performed, for example, by a receiver in a subscriber station or FIG. 1 or the transceiver of FIG. 2. The method 500 of path performance diversity can be implemented individually or in combination with one or more other receive diversity techniques. Although the method 500 illustrates the operation of multiple receive paths in sequence, a receiver may implement the method 500 to operate multiple receive paths in parallel such that they concurrently process the received signals.

The method 500 begins at block 510 where a receiver receives a signal using a first antenna. The receiver proceeds to block 520 and filters the signal from the first antenna with a receive filter that is configured with a first jammer rejection profile. The first jammer rejection profile is distinct from any other jammer rejection profile included in the receiver. A jammer rejection profile can include substantially no rejection of predetermined jammer frequencies, or substantial rejection of one or more predetermined jammer frequencies. The receive filter can include, for example, a notch or a band reject filter for each predetermined jammer frequency that is filtered out in the first jammer rejection profile.

The receiver proceeds to block 530 and receives a signal using a second antenna. The receiver can receive the signal using the second antenna concurrently or simultaneously with receiving a signal using the first antenna. Alternatively, the signal received using the second antenna may be time offset from the signal at a first antenna.

The receive proceeds to block 540 and filters the received signal using a receive filter that is configured with a second jammer rejection profile, distinct from any other jammer rejection profile used in the receiver. For example, the first receive filter can include a jammer rejection profile that notches a first jammer frequency and the second receive filter can include a distinct jammer rejection profile that notches a second jammer frequency that is distinct from the first jammer frequency.

The receiver proceeds to block 550 and performs further receive processing and/or demodulation of the filtered signals. For example, the receiver can be configured to frequency convert the filtered signals to baseband and digitize the signals prior to combining them. The receiver may also operate to further process the digitized baseband signals. For example, the receiver may demodulate the filtered signals prior to combining them. In an OFDM receiver, the receiver may perform an FFT transformation of received symbols and can perform channel estimation of each received and filtered signal prior to combining.

The receiver proceeds to block 560 and combines the filtered signals (or, more typically, signals derived from the filtered signals) from the first and second receive filters. As described above, the receiver can be configured to perform additional processing of each received and filtered signal prior to combining them. For example, the receiver can amplify and downconvert each filtered signal to a baseband signal and convert the baseband signal to a digital representation prior to a coherent combining operation.

The receiver can implement virtually any type of signal combining, and can, for example, perform a simple sum of the filtered signals, a coherent combination that minimizes some error metric, or a coherent combination that maximizes a metric. For example, the receiver can perform maximal ratio combining, best path selection, equal gain combining, switch diversity combining, antenna selection and the like, or some combination thereof.

Figure 6:
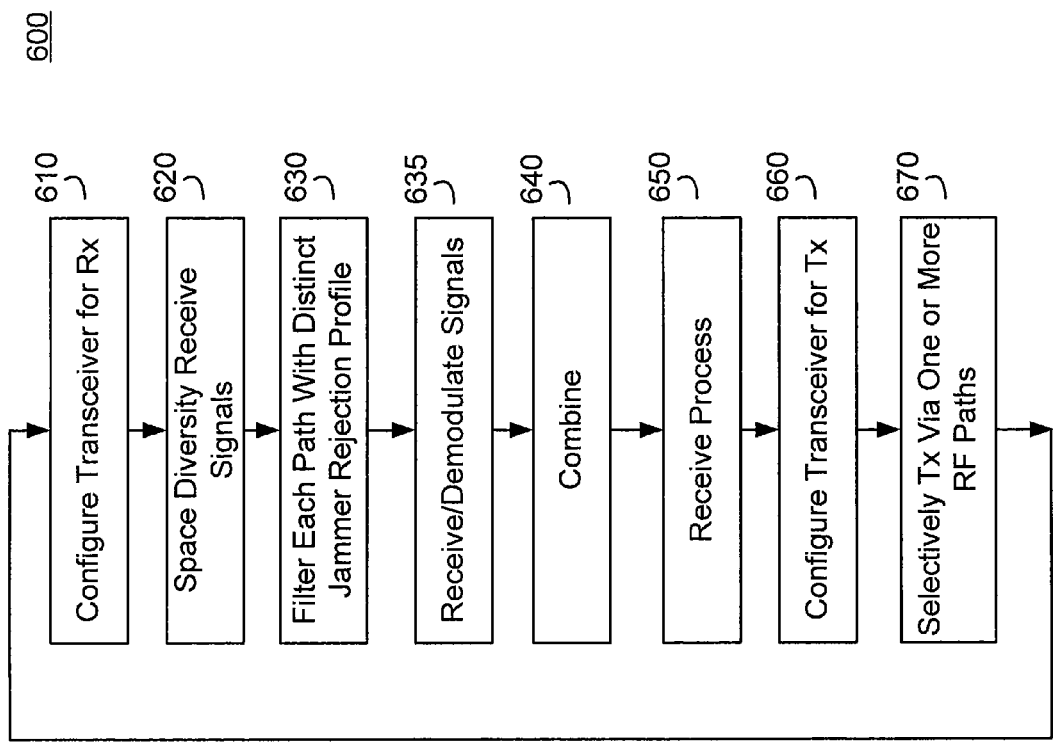
FIG. 6 is a simplified flowchart of an embodiment of a method of receive path performance diversity in a time division duplex transceiver.

FIG. 6 is a simplified flowchart of an embodiment of a method 600 of receive path performance diversity in a time division duplex transceiver. The method 600 can be implemented within a transceiver of a subscriber station of FIG. 1 or by the transceiver of FIG. 2. The method 600 is structured for a transceiver implementing TDD transmit and receive portions. However, the receive path performance diversity is not limited to a TDD implementation.

The method 600 begins at block 610 where the transceiver initially is configured for receive operation. For example, the transceiver may be configured for from transmit operation to receive operation prior to the start of a receive period.

The transceiver proceeds to block 620 and space diversity receives a plurality of signals using a plurality of antennas. Each antenna can be spatially distinct relative to any other antenna to promote spatial diversity. Although the method 600 is described in the context of implementing receive path performance diversity with space diversity, receive path performance diversity can be implemented with other diversity receiver types. For example, instead or in conjunction with space diversity, the transceiver may implement frequency diversity, time diversity, code diversity, and the like, or some combination thereof.

The transceiver proceeds to block 630 and filters each distinct receive path with a filter having a distinct jammer rejection profile. A spatial diversity transceiver includes one antenna for each of the plurality of receive paths. Each distinct path, corresponding to received signals from each antenna, are filtered with a distinct jammer rejection profile.

Each jammer rejection profile can reject any number of predetermined jammer frequencies, from none to a maximum number of predetermined jammer frequencies. However, each jammer rejection profile is distinct. That is, no other jammer rejection profile within the transceiver provides the same frequency response. Multiple jammer rejection profiles can reject the same predetermined jammer frequency provided the remainder of the jammer rejection profiles are distinct. That is, multiple combinations of jammer frequency rejection can include the same jammer frequency, provided the combinations are not identical.

The transceiver proceeds to block 635 and performs additional receive processing and/or demodulation on the filtered receive signals. The type of receive processing or demodulation, if any, performed on the filtered receive signals can depend on the type of signals used in the communication system.

The transceiver proceeds to block 640 and combines the multiple filtered signals in a manner that improves the resultant signal quality. For example, the transceiver can perform maximal ratio combining of baseband versions of the multiple filtered signals. The transceiver proceeds to block 650 and performs any additional receive signal processing on the combined signal.

The transceiver proceeds to block 660 and configures the transceiver for transmitting. After configuring the transceiver for transmitting, the transceiver proceeds to block 670 and selectively transmits the transmit signal using one or more of the filter paths and antennas used for the downlink signal. The transceiver selectively utilizes a filtered signal path based on one or more transmit operating parameters. The operating parameters can include, but are not limited to, transmit frequency, transmit power, and the like. After transmitting the uplink signal, the transceiver returns to block 610 to resume receive processing.

The transceiver embodiments previously described focus primarily on a transceiver that is configured to support a single wireless communication system or a single communication mode. However, receive path performance diversity and selective path transmission are not limited to a single mode transceiver.

Figure 7:
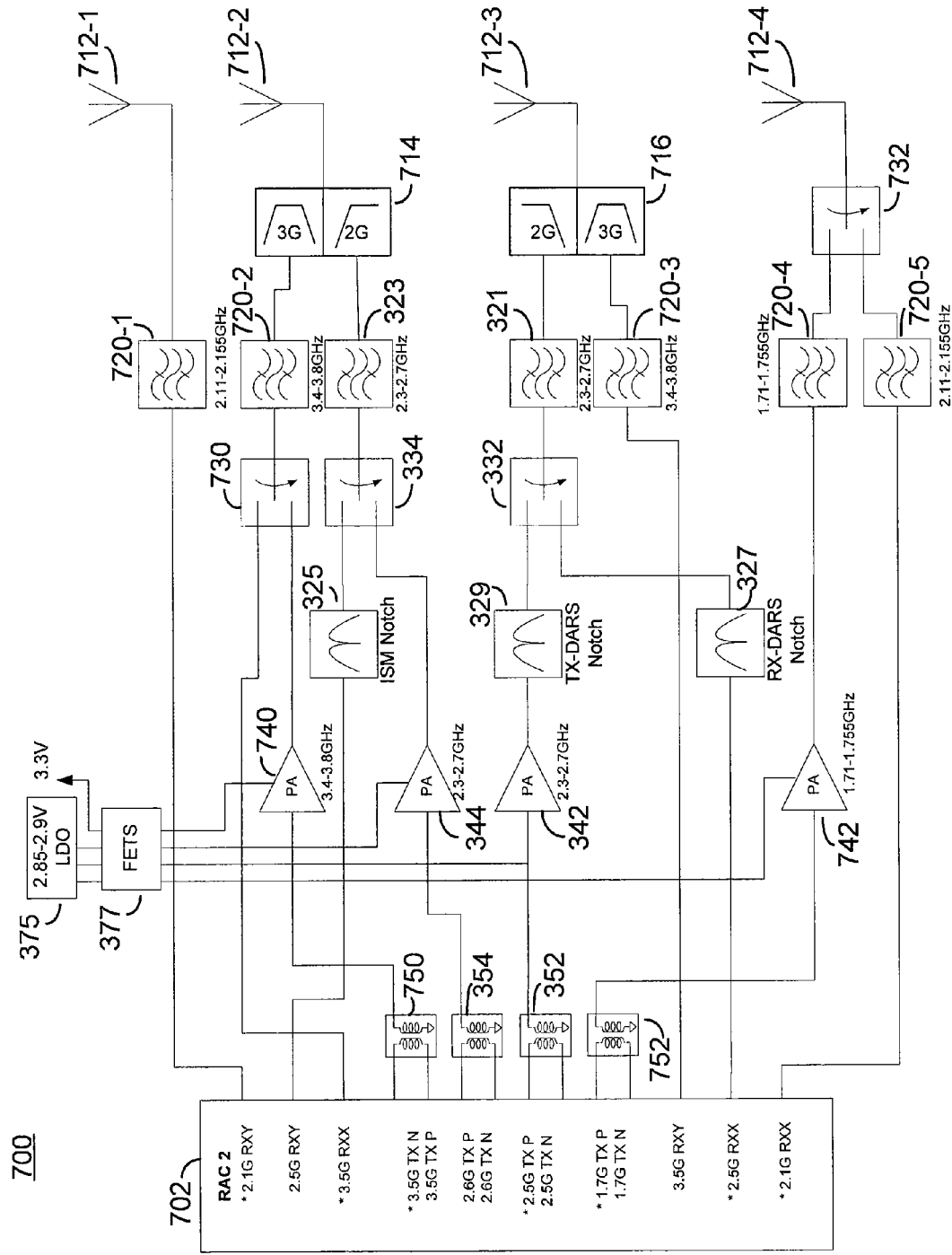
FIG. 7 is a simplified functional block diagram of an embodiment of a multi-band multimode transceiver with receive path performance diversity.

FIG. 7 is a simplified functional block diagram of an embodiment of a multi-band multimode transceiver 700 with receive path performance diversity. The transceiver 700 can be implemented within the system of FIG. 1, and can be configured to support communications across multiple frequency bands corresponding to multiple operating modes. The various operating modes can be exclusive or can overlap. The frequencies noted for reference in FIG. 7 are illustrative and the principles described herein can be directly applied to other frequency bands of interest and other expected jammer bands.

The transceiver 700 of FIG. 7 is configured to support WiMax-type operation across at least portions of the 2.3-2.7 GHz band, communication systems operating in 3.3-3.8 GHz band, as well as FDD Advanced Wireless Spectrum (AWS) systems. Although the transceiver 700 of FIG. 7 explicitly shows receive path performance diversity in only one operating mode, a plurality of operating modes may implement receive path performance diversity.

The transceiver 700 includes four distinct antennas 712-1 through 712-4 to support the multiple communication modes. A first antenna 712-1 supports only receive signals, but generally, the antennas 712-2, 712-3, 712-4, support both transmit and receive signals.

The configuration of the WiMax-type transceiver RF portion of FIG. 7 supporting receive path performance diversity is generally as shown in FIG. 3C. Thus, elements 321 323 325 327 329 332 334, 342, 344, 352, 354, 375 and 377 serve a similar function as like-numbered elements in FIG. 3C. The diplexers 714 and 716 have been added to the architecture to allow for concurrent support of multiple frequency bands by a limited number of antennas. Specifically, the diplexer 714 couples energy below 3 GHz from the antenna 712-2 to the 2.3 to 2.7 GHz filter 323. And, the diplexer 716 couples energy below 3 GHz from the antenna 712-3 to the 2.3 to 2.7 GHz filter 321.

The first antenna 712-1 is coupled to a first AWS receive filter 720-1. The first AWS receive filter 720-1 couples the receive signal to an input of a multimode RF analog circuit 702. The fourth antenna 712-4 is used by both AWS transmit and receive signals. When in receive mode, a switch 732 couples the fourth antenna 712-4 to a second AWS receive filter 720-5. The output of the filter 720-5 is coupled to another receive input of the RF analog circuit 702. In this way, two diversity receive paths are provided to receive AWS spectrum. In an alternate embodiment, the AWS paths could share one or more of antennas 712-2 and 712-3 if diplexers 714 and 716 were designed with a port which passes AWS energy or were replaced with RF switches. Such a design introduces additional insertion loss and desensitizes the AWS receivers but can provide some cost and size benefits due to the elimination of one or more antennas.

The RF analog circuit 702 couples AWS transmit signals via a fourth balun 752 to an AWS PA 742. The output of the AWS PA 742 is coupled to an AWS transmit filter 720-4 that reduces emissions outside of the AWS band. When in transmit mode, the switch 732 couples the output of the filter 720-4 to the fourth antenna 712-4.

A first diplexer 714 couples energy in the 3 GHz band from the second antenna 712-2 to the first 3 GHz bandpass filter 720-2. The first 3 GHz bandpass filter 720-2 is coupled to a 3 GHz T/R switch 730. When in receive mode, the 3 GHz T/R switch 730 couples the signals from the first 3 GHz bandpass filter 720-2 to an input of the RF analog circuit 702.

The RF analog circuit 702 includes a 3 GHz signal output that is coupled via a third balun 750 to the input of a 3 GHz PA 740. The 3 GHz T/R switch 730 couples the signals from the 3 GHz PA 740 to the 3 GHz bandpass filter 720-2 when controlled to support transmit signals.

The second diplexer 716 couples signals in the 3 GHz band from the third antenna 712-3 to a second 3 GHz bandpass filter 720-3. The second 3 GHz bandpass filter 720-3 couples the receive signals to a corresponding input of the RF analog circuit 702. In this way, two diversity receive paths are provided for 3.4 to 3.8 GHz spectrum.

Methods and apparatus for receive path performance diversity have been described herein. The methods and apparatus permit a receiver to operate under a wide range of operating environments including environments having one or more predetermined jammers. The receiver can be configured to maintain sensitivity and yet operate under harsh out of band jammer conditions.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of receive path performance diversity, the method comprising:
   receiving a first signal in a first signal path;
   band-pass filtering the first signal in the first signal path to attenuate frequencies outside of a first radio frequency (RF) operating band;
   filtering the band-pass filtered first signal, by notch filtering or band reject filtering, at one or more frequencies within the first RF operating band to attenuate one or more jamming signals and generate a first path intermediate signal;
   receiving a second signal in a second signal path;
   band-pass filtering the second signal in the second signal path to attenuate frequencies outside of the first RF operating band and generate a second path intermediate signal,
   wherein the first path intermediate signal is attenuated by said notch filtering or band reject filtering at one or more frequencies not attenuated in the second path intermediate signal; and
   combining a first path output signal that is at least based on the first path intermediate signal with a second path output signal that is at least based on the second path intermediate signal.

2. The method of claim 1, wherein, before combining the first path output signal with the second path output signal, filtering the second path intermediate signal, by notch filtering or band reject filtering, at one or more frequencies within the first RF operating band to attenuate one or more jamming signals.

3. The method of claim 1, wherein the second path intermediate signal is not filtered by notch filtering or band reject filtering.

4. The method of claim 2, wherein each of the first signal path and the second signal path comprises a filter response that substantially attenuates at least one predetermined jammer frequency of a plurality of predetermined jammer frequencies.

5. The method of claim 1, wherein receiving the second signal comprises receiving the second signal concurrently with receiving the first signal.

6. The method of claim 1, wherein receiving the second signal comprises receiving the second signal using an antenna that is spatially diverse from an antenna in the first signal path.

7. The method of claim 1, wherein combining the first path output signal with the second path output signal comprises combining a first baseband signal based on the first path intermediate signal with a second baseband signal based on the second path intermediate signal, and wherein the first baseband signal and the second baseband signal occupy the same portion of the baseband spectrum.

8. The method of claim 1, wherein combining the first path output signal with the second path output signal comprises coherently combining the first path output signal with the second path output signal.

9. The method of claim 1, wherein combining the first path output signal with the second path output signal comprises maximal ratio combining the first path output signal with the second path output signal.

10. A method of receive path performance diversity, the method comprising:
    receiving signals via a plurality of antennas;
    band-pass filtering each received signal from each antenna of the plurality of antennas to attenuate frequencies outside of a first radio frequency (RF) operating band;
    filtering, by notch filtering or band reject filtering, at least one of the band-pass filtered signals at one or more frequencies within the first RF operating band to attenuate one or more jamming signals, wherein at least one of the filtered signals has a distinct set of frequencies attenuated by the notch filtering or band reject filtering than another filtered signal; and
    combining output signals that are derived from each filtered signal.

11. The method of claim 10, further comprising:
    filtering, by the notch filtering or the band reject filtering, a transmit signal; and selectively time division duplexing (TDD) the transmit signal.

12. The method of claim 11, wherein the notch filtering or the band reject filtering is selected based on at least one transmit operating parameter.

13. The method of claim 11, wherein the notch filtering or the band reject filtering is selected based on a transmit signal frequency.

14. The method of claim 10, wherein the plurality of antennas comprises a plurality of spatially diverse antennas.

15. The method of claim 10, wherein each of the notch filtering or the band reject filtering attenuates at least one predetermined jammer frequency.

16. The method of claim 10, wherein one of the distinct sets of frequencies is a null set, such that one of the band pass filtered signals is not filtered by notch filtering or band reject filtering.

17. The method of claim 10, wherein combining output signals comprises maximal ratio combining.

18. An apparatus having receive path performance diversity, the apparatus comprising:
    a first antenna configured to receive a first signal;
    a second antenna configured to receive a second signal;
    a first filter coupled to the first antenna and configured to band-pass filter the first signal to attenuate frequencies outside of a first radio frequency (RF) operating band, filter, by notch filtering or band reject filtering, the band-pass filtered first signal at one or more frequencies within the first RF operating band to attenuate one or more jamming signals, and
generate a first intermediate signal;
a second filter coupled to the second antenna and configured to
band-pass filter the second signal to attenuate frequencies outside of the first radio frequency (RF) operating band, and
generate a second intermediate signal, wherein the first intermediate signal is attenuated by said notch filtering or band reject filtering at one or more frequencies not attenuated in the second intermediate signal; and
a combiner coupled to the first filter and second filter configured to combine output signals that are based on the first intermediate signal and the second intermediate signal.

19. The apparatus of claim 18, wherein the first antenna and second antenna are spatially diverse.

20. The apparatus of claim 18, wherein the second intermediate signal is not filtered by notch filtering nor band reject filtering such that the second intermediate signal is not attenuated within the RF operating band.

21. The apparatus of claim 18, wherein the second filter is further configured to:
filter, by notch filtering or band reject filtering, the band-pass filtered second signal at one or more frequencies within the first RF operating band to attenuate one or more jamming signals.

22. The apparatus of claim 21, wherein the first filter is further configured to:
attenuate at approximately 2.33 GHz.

23. The apparatus of claim 21, wherein the first filter is further configured to:
attenuate at approximately 2.45 GHz.

24. The apparatus of claim 21, wherein the combiner comprises a maximal ratio combiner.

25. The apparatus of claim 18, further comprising:
a first power amplifier coupled to the first filter and configured to provide a first transmit signal over the first antenna; and
a second power amplifier coupled to the second filter and configured to provide a second transmit signal over the second antenna.

26. An apparatus having receive path performance diversity, the apparatus comprising:
a plurality of antennas configured to receive a plurality of signals;
a plurality of filters coupled to the plurality of antennas and configured to
band-pass filter each received signal from each antenna of the plurality of antennas to attenuate frequencies outside of a first radio frequency (RF) operating band;
filter, by notch filtering or band reject filtering, at least one of the band pass filtered signals at one or more frequencies within the first RF operating band to attenuate one or more jamming signals, wherein at least one of the filtered signals has a distinct set of frequencies attenuated by the notch filtering or band reject filtering than another filtered signal, and
generate a plurality of intermediate signals;
a plurality of receivers coupled to the plurality of filters and configured to process the plurality of intermediate signals to generate a plurality of output signals; and
a combiner coupled to the plurality of receivers and configured to combine the plurality of output signals.

27. The apparatus of claim 26, further comprising:
a plurality of transmitters configured to generate a plurality of transmit signals; and
a plurality of switches, each controllable to selectively couple an antenna of the plurality of antennas to a receiver of the plurality of receivers or a transmitter of the plurality of transmitters.

28. The apparatus of claim 26, wherein one of the distinct sets of frequencies is a null set, such that one of the band pass filtered signals is not filtered by notch filtering or band reject filtering.

29. The apparatus of claim 28, wherein the plurality of antennas comprises a plurality of spatially diverse antennas.

30. The apparatus of claim 28, wherein the notch filtering or the band reject filtering is selected based on at least one transmit operating parameter.

31. The apparatus of claim 28, wherein the notch filtering or the band reject filtering is selected based on a transmit signal frequency.

* * * * *